(12) United States Patent
Oluyemi et al.

(10) Patent No.: US 11,804,963 B2
(45) Date of Patent: Oct. 31, 2023

(54) SYSTEM AND METHOD FOR PERMISSIONED BLOCKCHAIN ACCESS INTO A COMPUTING NETWORK

(71) Applicant: International Business Machines Corporation, Armonk, NY (US)

(72) Inventors: Oluwanifemi Oluyemi, Toronto (CA); Chuan Ran, Morrisville, NC (US); Vamsee Movva, Cary, NC (US); A. Jaylani Sharif, Ashburn, VA (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 17/244,391

(22) Filed: Apr. 29, 2021

(65) Prior Publication Data

US 2022/0353077 A1 Nov. 3, 2022

(51) Int. Cl.
| | |
|---|---|
| *H04L 29/06* | (2006.01) |
| *H04L 9/32* | (2006.01) |
| *G06Q 20/06* | (2012.01) |
| *G06Q 20/22* | (2012.01) |
| *H04L 67/1061* | (2022.01) |
| *H04L 9/00* | (2022.01) |

(52) U.S. Cl.
CPC ....... *H04L 9/3213* (2013.01); *G06Q 20/0658* (2013.01); *G06Q 20/223* (2013.01); *H04L 9/3263* (2013.01); *H04L 67/1061* (2013.01); *H04L 9/50* (2022.05); *H04L 2209/56* (2013.01)

(58) Field of Classification Search
CPC . H04L 9/3213; H04L 9/3263; H04L 67/1061; H04L 9/50; H04L 2209/56; H04L 63/10; H04L 63/101; H04L 63/102; G06Q 20/0658; G06Q 20/223; G06F 21/62; G06F 21/6209; G06F 21/6218
See application file for complete search history.

(56) References Cited

U.S. PATENT DOCUMENTS

| | | |
|---|---|---|
| 7,383,433 B2 | 6/2008 | Yeager et al. |
| 7,937,583 B2 | 5/2011 | Thornton et al. |

(Continued)

FOREIGN PATENT DOCUMENTS

JP 560828 B2 10/2019

OTHER PUBLICATIONS

International Search Report dated Aug. 10, 2022, received in a corresponding foreign application, 13 pages.

(Continued)

*Primary Examiner* — Malcolm Cribbs
(74) *Attorney, Agent, or Firm* — Scully, Scott, Murphy & Presser, P.C.

(57) ABSTRACT

A computer-implemented system, method and computer program product for providing access to a network of computing nodes that includes: requesting, by a client, access into a host node in the network, preferably a private network; selecting a digital certificate issuer; verifying, by the digital certificate issuer, the identity of the client's token; adding, by the certificate issuer, a nonce to a distributed ledger; and granting the client access to the host node in the network. The computing nodes in an embodiment are ranked based upon CPU capacity, and computing nodes with highest CPU capacity ranking are selected to participate in a proof-of-capacity consensus to solve for the nonce.

22 Claims, 6 Drawing Sheets

(56) References Cited

U.S. PATENT DOCUMENTS

| | | | |
|---|---|---|---|
| 8,776,192 | B2 | 7/2014 | Schiefelbein |
| 9,942,037 | B2 | 4/2018 | Bartok et al. |
| 10,003,458 | B2 | 6/2018 | Ylonen |
| 10,277,632 | B2 | 4/2019 | Ylonen |
| 10,320,843 | B1* | 6/2019 | Dobrek ................. H04L 9/0822 |
| 10,341,327 | B2 | 7/2019 | Kola et al. |
| 10,516,538 | B2 | 12/2019 | Fielding et al. |
| 10,601,597 | B2 | 3/2020 | Callan et al. |
| 10,990,693 | B1* | 4/2021 | Newman ................ G06F 21/602 |
| 2009/0177894 | A1* | 7/2009 | Orsini .................... H04L 9/321 |
| | | | 713/193 |
| 2017/0041303 | A1 | 2/2017 | Trimmer et al. |
| 2018/0227293 | A1 | 8/2018 | Uhr et al. |
| 2018/0254905 | A1 | 9/2018 | Chun |
| 2019/0036906 | A1 | 1/2019 | Biyani et al. |
| 2019/0259007 | A1 | 8/2019 | LaMontagne |
| 2020/0082398 | A1* | 3/2020 | Xu ............................ H04L 9/50 |
| 2020/0221302 | A1* | 7/2020 | Filart ................... H04L 65/1104 |
| 2021/0083882 | A1 | 3/2021 | Venable, Sr. |
| 2021/0091960 | A1* | 3/2021 | Werner ..................... H04L 9/50 |
| 2021/0303553 | A1* | 9/2021 | Zanpure .............. G06F 16/2365 |
| 2022/0182374 | A1* | 6/2022 | Peddada ............. H04L 63/0807 |

OTHER PUBLICATIONS

Anwar, H., "Consensus Algorithms: The Root of Blockchain Technology", Aug. 25, 2018, 26 pages, https://101blockchains.com/consensus-algorithms-blockchain/.

\* cited by examiner

SYSTEM AND METHOD FOR PERMISSIONED BLOCKCHAIN ACCESS INTO A COMPUTING NETWORK

BACKGROUND

The present application relates generally to information handling and/or data processing networks, and more particularly to authenticating users in a network, and providing access (e.g., remote access) into a computing network, preferably using an improved permissioned blockchain process.

SSH, also known as Secure Shell or Secure Socket Shell, is a cryptographic network protocol that gives users a secure way to access a computer over an unsecured network. SSH is a method for secure remote login from one computer to another that provides strong authentication and protects communications with strong encryption. Secure Shell (SSH) certificates are a scalable way of authenticating multiple users to one or more hosts in a computing network. All hosts are configured to trust any certificates that are signed by a Certificate Authority's public key. The Certificate Authority is a key pair (public key and private key) traditionally that issues from a single host. A problem arises in that if there is a failure by that single host, e.g., an outage of the single host, then trying to sign into the network will fail. In other words, if that single host cannot issue a digital certificate (e.g., a Certificate of Authority (CA)), then a client/peer computing device can not join the network, and accordingly having one central Certificate Authority can be a single, potentially devastating point of failure. Using a proprietary CA server serves as a risk when something goes wrong with that sole server, as SSH authentication will be blocked during the time it takes to get the server back up and running. It would be advantageous to have a system and/or method to overcome the disadvantage of having a sole, single computing node that issues certificates of authority, e.g., SSH certificates.

In addition, having a sole server issue the Certificate of Authority also provides an inefficient process of on-boarding new compute nodes into the network. Every time a new node is added to the network there are several steps required in order to enable the new node to accept signed certificates from the CA server. Uploading the public key of the Certificate of Authority and SSHD configuration changes are required on every new node. These steps are also required when the Certificate of Authority public key has to change. Having a single CA server can be inefficient in handling all these tasks. It would be beneficial to have a system and/or method to overcome the disadvantages of having a single server or computing node handling all the tasks to enable a new node to access the network.

SUMMARY

The summary of the disclosure is given to aid understanding of, and not with an intent to limit the disclosure. The present disclosure is directed to a person of ordinary skill in the art. It should be understood that various aspects and features of the disclosure may advantageously be used separately in some circumstances or instances, or in combination with other aspects, embodiments, and/or features of the disclosure in other circumstances or instances. Accordingly, variations and modifications may be made to the system and/or method to achieve different effects. In this regard it will be appreciated that the disclosure presents and describes one or more inventions, and in aspects includes numerous inventions as defined by the claims.

A system, method and/or computer program product is disclosed for providing access to a network of computing nodes, preferably a closed network of computing nodes. The system, method, and/or computer program in one or more embodiments includes: requesting, by a client, access into a host node in the network, preferably a private network; selecting a digital certificate issuer; verifying, by the digital certificate issuer, the identity of the client's token; adding, by the certificate issuer, a nonce to a distributed ledger; and granting the client access to the host node in the network. In an embodiment, the system, method, and/or computer program product includes ranking the computing nodes in the network and selecting, according to their rank in the network, one or more (preferably at least three) computing nodes to participate in a proof-of-capacity consensus to solve for the nonce. Ranking the computing nodes in the network is preferably based upon their unused CPU capacity. The system, method, and/or computer program product in an embodiment further includes selecting the computing node with the highest rank as the main miner, and retrieving, by the main miner, a deadline from a plugin installed on the main miner. In an aspect, the system, method, and/or computer program product further includes storing, in a nonce solution store on all the computing nodes selected to participate in the proof-of-capacity consensus, all possible solutions to the nonce.

The system, method, and/or computer program product in an aspect further includes computing, by all the computing nodes selected to participate in the proof-of-capacity consensus, the proof-of-capacity consensus to solve for the nonce. In an aspect, the system, method, and/or computer program product further includes selecting the node that contains the solution to the nonce to be the digital certificate issuer. In a further aspect, the system, method, and/or computer program product further includes: computing, by all the computing nodes selected to participate in the proof-of-capacity consensus, the proof-of-capacity consensus to solve for the nonce, and selecting, in response to none of the computing nodes selected to participate in the proof-of-capacity consensus solving for the nonce within the deadline, the main miner as the digital certificate issuer.

The system, method, and/or computer program product in one or more embodiments further includes adding a new host node to the network, wherein adding a new host node to the network includes: determining, by all the computing nodes on the network, if the new host node has a set of network defined characteristics; retrieving, in response to determining that the new host node has a set of network defined characteristics, state information from the new host node; and sharing the state information with all the computing nodes on the network. Adding a new host node to the network in an aspect further includes sharing the distributed ledger with the new host node, and in a further aspect includes: ensuring the new host node is to be added to the same network as the computing nodes; installing a plugin on the new host node; detecting the network by the plugin; and informing all the computing nodes on the network that a new host node has joined the network. Sharing the distributed ledger with the new host node in an embodiment includes utilizing a RAFT protocol wherein databases containing the distributed ledger in a RAFT leader node are shared with the new host node.

A non-transitory computer readable medium that includes programming instructions is also disclosed that, when executed by at least one hardware processor, configure the at least one hardware processor to perform the processes and/or steps discussed above. In one or more aspects a computer-implemented system and/or method is disclosed to configure a network of computing nodes, wherein the computer implemented system and/or method includes a memory storage device storing program instructions; and a hardware processor having circuitry and logic to execute said program instructions to configure the network of computing nodes, the hardware processor coupled to said memory storage device and in response to executing said program instructions is configured to perform the processes and/or steps discussed above. In one or more embodiments, the system, method, and/or computer program product adds a new host node to the network wherein the system, method and/or computer program product is configured and/or includes instructions to: determine if the new host node is to be added to the same network as the other computing nodes; install, in response to determining that the new host node is to be added to the same network as the other computing nodes, a plugin on the new host node; detect the network by the plugin; inform all the computing nodes on the network that a new host node has joined the network; and share the distributed ledger with the new host node. The plugin in an embodiment includes a Certificate Issuer Module, a Ranking Algorithm Module, a Nonce Generator, a Document Database containing the distributed ledger and state information, and a Key-Value Database.

The foregoing and other objects, features, and/or advantages of the invention will be apparent from the following more particular descriptions and exemplary embodiments of the invention as illustrated in the accompanying drawings wherein like reference numbers generally represent like parts of the illustrative embodiments of the invention.

BRIEF DESCRIPTION OF THE DRAWINGS

The various aspects, features, and/or embodiments of a system and/or method to add a host to a network and/or permit a client to remote access into a node in a network, e.g., a computing network of nodes, preferably using permissioned blockchain technology, and in an aspect to add a node and/or remote access into a node in a closed network, will be better understood when read in conjunction with the figures provided. Embodiments are provided in the figures for the purpose of illustrating aspects, features, and/or various details of the systems and methods, but the claims should not be limited to the precise arrangement, features, aspects, embodiments, systems, modules, functional units, programming, instructions, methods, processes, techniques, and/or devices shown, and the arrangements, features, aspects, embodiments, systems, modules, functional units, programming, instructions, methods, processes, techniques, and/or devices shown may be used singularly or in combination with other arrangements, features, aspects, embodiments, systems, modules, functional units, programming, instructions, methods, techniques, processes, and/or devices.

DETAILED DESCRIPTION

The following description is made for illustrating the general principles of the invention and is not meant to limit the inventive concepts claimed herein. In the following detailed description, numerous details are set forth in order to provide an understanding of the system, method, and/or techniques of the invention for securely accessing a node and/or a peer device in a computing network, and in an aspect adding nodes and obtaining remote access to a computing network. It will be understood, however, by those skilled in the art that different and numerous embodiments of the system and/or method of the invention may be practiced without the specific details, and the claims and disclosure should not be limited to the arrangements, systems, devices, modules, functional units, programming, instructions, embodiments, features, aspects, processes, methods, techniques, and/or details specifically described and shown herein. Further, particular features, aspects, embodiments, arrangements, systems, devices, modules, functional units, programming, instructions, methods, processes, techniques, details, etc. described herein can be used in combination with other described features, aspects, embodiments, arrangements, structures, systems, devices, modules, functional units, programming, instructions, techniques, methods, processes, details, etc. in each of the various possible combinations and permutations.

It is assumed that those skilled in the art are familiar with computing environments, including networked computing environments, including for example obtaining secure access to a network of computing nodes, using for example, SSH protocol. It is further assumed that those skilled in the art are familiar with permissioned blockchain technology. The following discussion omits or only briefly describes conventional features of computing networks, including computing network architecture, permissioned block chain technology, remote accessing (e.g., SSH remote accessing) into a computer node, and their operations, which should be apparent to those skilled in the art. It may be noted that a numbered element is numbered according to the figure in which the element is introduced, and is typically referred to by that number throughout succeeding figures.

Figure 1:
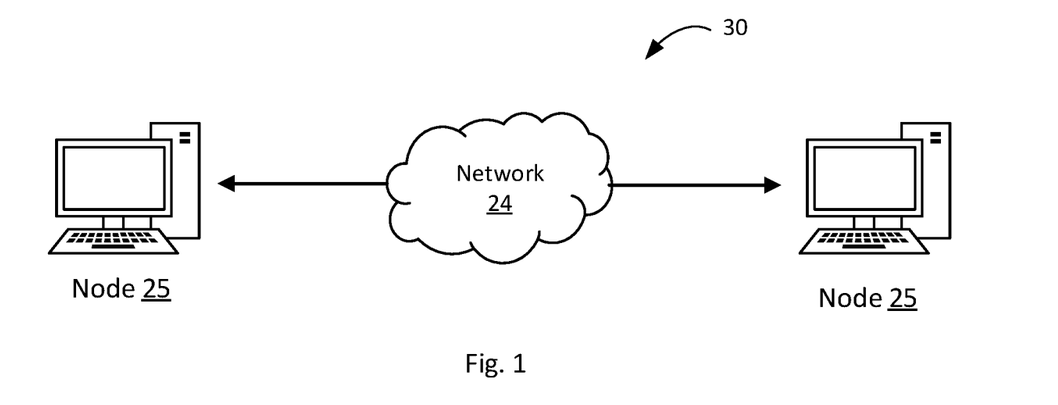
FIG. 1 depicts two peer devices connected on a peer network according to an embodiment of the disclosure.
Figure 2:
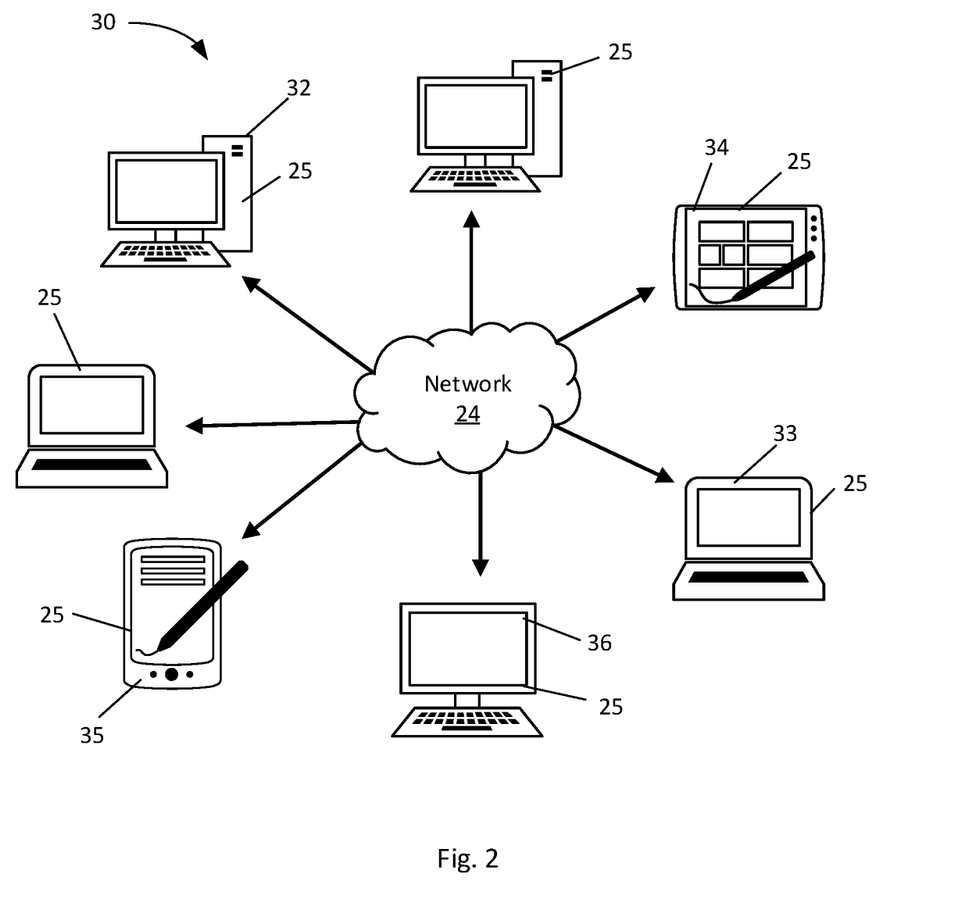
FIG. 2 depicts a plurality of peer devices connected over a network in a peer group.

FIG. 1 illustrates two peer devices 25A and 25B, also referred to as computing nodes, connected in a computing network 30. The peer devices 25 can be a computer, a virtual computer or virtual machine (VM), or a node. Either of the two peer devices 25 can serve as a host or client to the other peer device. FIG. 2 illustrates several peer devices 25 connected over the network 24 in a computing network 30. In the computing network 30, any of the peer devices 25 can serve as a host or a client of the other peer devices. The peer devices 25 are also referred to as nodes, and as illustrated can take many forms, for example, computers 32, laptops 33, smart phones 34, personal assistants 35, terminals 36, virtual machines, or other forms.

Figure 3:
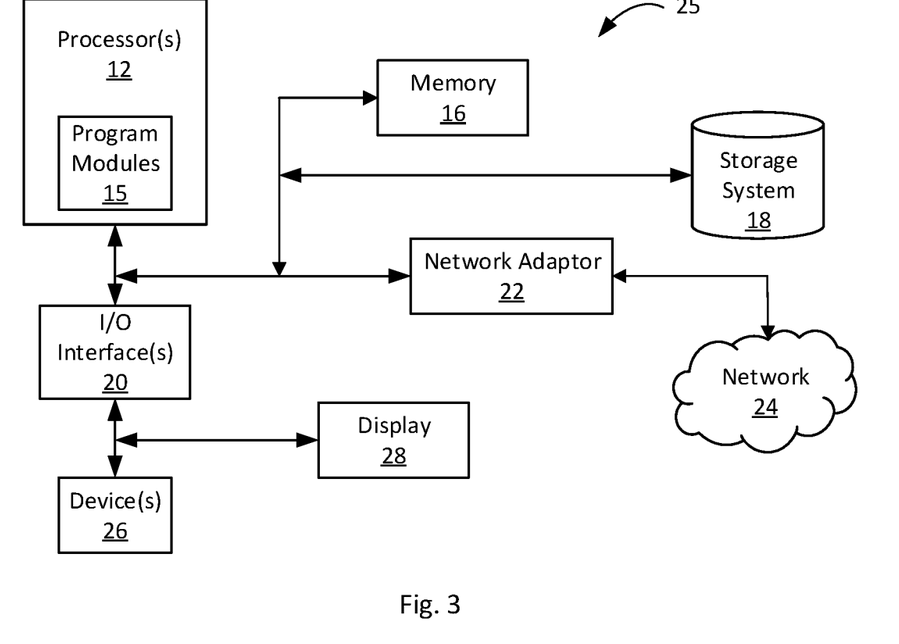
FIG. 3 illustrates an exemplary peer device connectable to other peer devices over a network in accordance with the present disclosure.

FIG. 3 illustrates an example computing system in accordance with the present disclosure that can be used as a node 25 in a computing network. It is to be understood that the computer system or computing node 25 depicted is only one example of a suitable electronic computer system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 3 may include, but are not limited to, mainframe computer systems, server computer systems, thin clients, thick clients, personal computers, networked computers, minicomputer systems, handheld or laptop devices, tablets, smart phones, multiprocessor systems, microprocessor-based systems, set top boxes, programmable consumer electronics, and distributed cloud computing environments that include any of the above systems or devices, and the like.

In some embodiments, the computer system or node 25 may be described in the general context of computer system executable instructions, embodied as program modules or software programs stored in memory 16, being executed by the computer system. Generally, program modules may include routines, programs, objects, components, logic, data structures, and so on that perform particular tasks and/or implement particular input data and/or data types in accordance with the present invention.

The components of the computer system 25 may include, but are not limited to, one or more processors or processing units 12, a memory 16, and a bus 14 that operably couples various system components, including memory 16 to processor 12. In some embodiments, the processor 12 may execute one or more program modules 15 that are loaded from memory 16, where the program module(s) embody software (program instructions) that cause the processor to perform one or more method embodiments of the present invention. In some embodiments, program module 15, e.g., software programs, may be programmed into the circuits of the processor 12, loaded from memory 16, storage device 18, network 24, and/or combinations thereof. It is generally appreciated that processor 12 contains circuits including integrated circuits to perform operations of the processor 12.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system 25 may include a variety of computer system readable media. Such media may be any available media that is accessible by the computer system, and it may include both volatile and non-volatile media, removable and non-removable media. Memory 16 (sometimes referred to as system memory) can include computer readable media in the form of volatile memory, such as random access memory (RAM), cache memory, and/or other forms of memory. Computer system 25 can further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system 25 can also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Computer system or node 25 can communicate with one or more networks 24 such as a local area network (LAN), a general wide area network (WAN), a private network, a public network (e.g., the Internet) and/or a closed network via network adapter 22. In the present disclosure, one or more of the networks 24 with which computer system 25 would communicate would connect node 25 to one or more other nodes in a network, and in an embodiment a closed network. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk-drive arrays, RAID systems, tape drives, and data archival storage systems, etc.

In one or more embodiments permissioned peer-to-peer SSH certificate authority authentication between computer nodes in a network for high-availability SSH authentication is provided where in an aspect all hosts in a network are permitted to participate in signing Certificates of Authority (CA) used to access, e.g., login to, any of the network hosts. In one or more embodiments, a network uses permissioned blockchain technology that permits anyone to join the network after suitable verification of their identity. In one or more aspects permissioned blockchain technology is used to: permit all the hosts to verify a signed Certificate of Authority by consensus, access a shared ledger, and store a record of the signed Certificates of Authority (CAs). Every node in the network in an embodiment works together to issue the Certificate of Authority so reliance on a single or sole node to issue Certificates of Authority (CAs) is removed. Permissioned blockchain is leveraged to authorize a client node the ability to SSH into remote hosts, which can avoid potential single points of failure in traditional CA architectures.

In an embodiment, multiple nodes store a distributed or shared document (ledger) that holds the ability to issue certificates of authority to clients wishing to gain access, e.g., SSH access, to any of the nodes in the network. Certificates of Authority (CAs) in an aspect are issued when all the nodes in the network run a blockchain consensus algorithm to verify that the client has access to the network. A shared ledger, according to an embodiment, is used to store all clients that have, have had, or have been denied access to any of the remote hosts in the closed network. Every host node in an aspect has a copy of all nodes granted access which improves the ability to audit.

In a further embodiment, unused CPU in the compute nodes in the network for running the blockchain consensus algorithm are monitored and ranked. Nodes with more unused compute capacity preferably are given priority in solving the blockchain consensus algorithm. In this manner, CPU being utilized for other operations, e.g., mission critical operations, aren't blocked or bogged down by the blockchain process. In one or more embodiments, a system and/or method uses a set of node characteristics to validate and enable compute nodes to easily join and/or leave the network.

A system for permissioned blockchain (e.g., peer-to-peer SSH certification authority) for authentication between compute nodes in a computing network for high availability SSH authentication is disclosed. In an embodiment, all hosts can verify a signed digital certificate by consensus, store a record of the signed digital certificates (e.g., store all clients that have, have had, and have been denied access to any of the hosts in the network (e.g., the closed network)), and access a shared distributed ledger. In one or more aspects, multiple nodes, preferably that have unused capacity, have the ability to issue digital certificates to a user (client) that desires to gain access (e.g., SSH access) to any of the nodes in the network. In a further aspect, the multiple nodes store the shared, distributed ledger and the digital certificates are issued when the nodes in the network run a proof-of-capacity consensus algorithm to verify that the user (client) is authorized to access the node and/or network.

Figure 4:
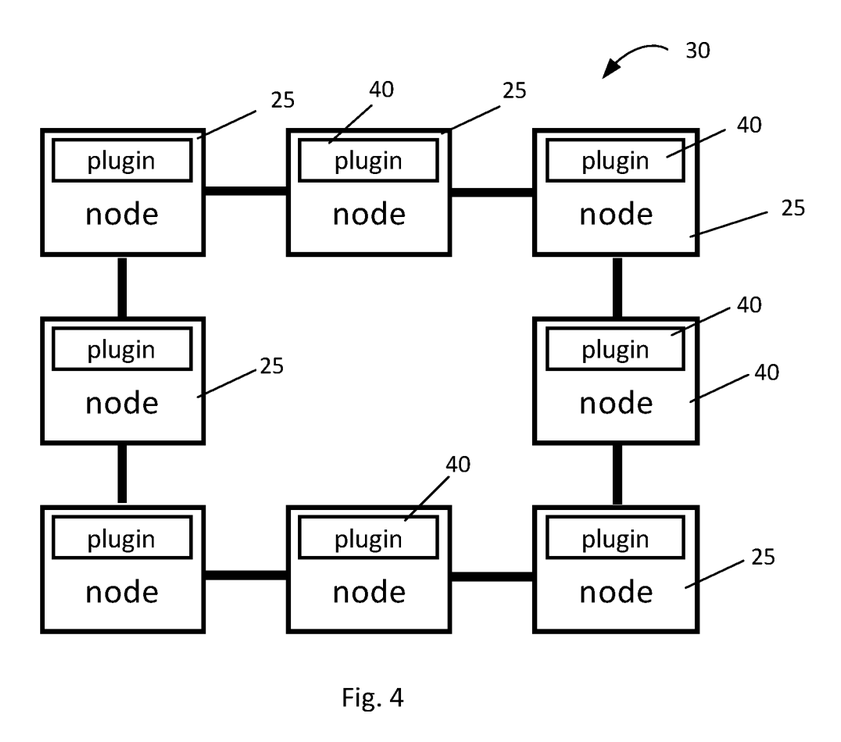
FIG. 4 schematically depicts an exemplary peer network having a number of peer devices connectable in accordance with one or more embodiments of the present disclosure.

FIG. 4 illustrates a computing network 30 of computing nodes 25, also referred to as peer-to-peer devices. Network 30 preferably in one or more embodiments is a closed network, and in FIG. 4 shows a closed ring network topology. Each node 25 for example can be a computer and/or a virtual machine. Each node can be a host or a client. A host is typically a computer hardware device or software connected to other devices, e.g., computers, for which it provides data or services, preferably over a computing network. Every node 25, e.g., computer, connected on network 30 can act as a host to other peers or nodes 25 on the network 30. A host for example can be a computer, virtual machine, peer device, and/or node. A client is typically a computer hardware device or software that accesses a service or data made available by a server or host. The server or host is often located on a separate physical computer from the client, and the client accesses the data and/or services by way of a network. The host for example, can be a computer, virtual machine, peer device, and/or node.

Figure 5:
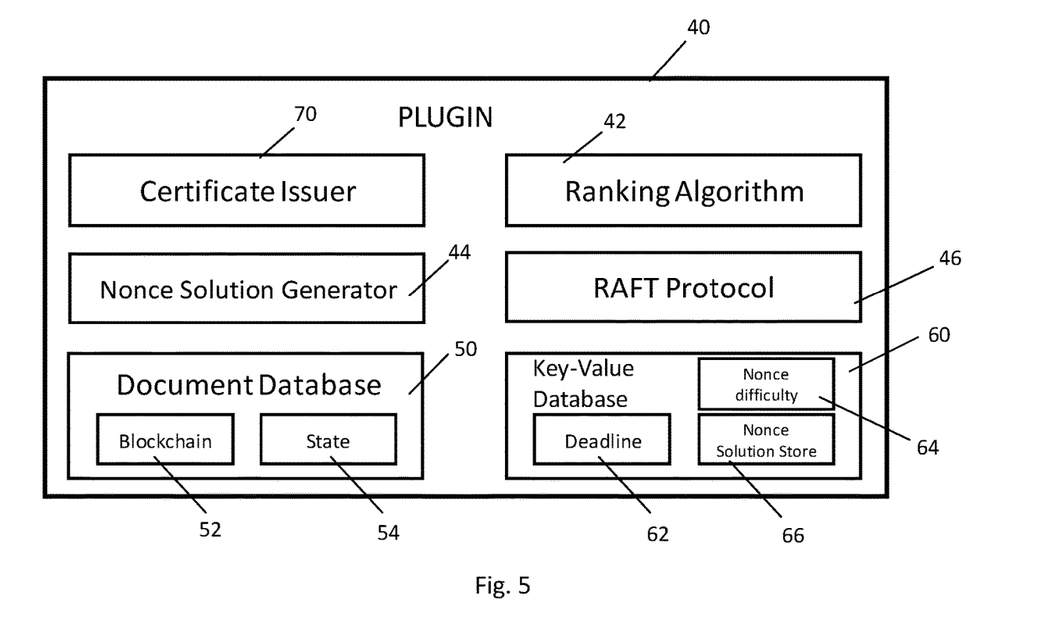
FIG. 5 schematically illustrates an embodiment of an overview diagram of a Plugin to a peer device or node to implement one or more embodiments of the present disclosure.

Each computer node 25 in the network 30 is provided with an operating system (O/S) software plugin 40. In one or more embodiments, each compute node 25 installs the plugin 40, and the plugin is installed, maintained, and updated, preferably using the appropriate package manager utilized by the operating system (O/S). The plugin 40 in one or more embodiments includes node monitoring, a ranking algorithm, node information capture, blockchain proof-of-capacity algorithm, RAFT protocol, and a shared copy of Asymmetric CA keys. In an example embodiment, each plugin 40 includes Nonce Solution Generator 42, Ranking Algorithm Module 44, RAFT Protocol Module 46, Document Database 50, Key-Value Database 60, and Certificate Issuer Module 70, as illustrated in FIG. 5. It will be appreciated that plugin 40, and the disclosed modules, provides instructions and logic for operating circuitry in an embodiment to handle, and/or facilitate securely adding a node 25, e.g., a host node, to a network 30, and in an aspect to handle and/or facilitate a client securely accessing, e.g., gaining SSH remote access, to one of the nodes 25 in the network 30. It can be appreciated in an embodiment that the client does not have to be in the network.

The plugin 40 in the first node 25 to join the network 30 creates a genesis block of a block chain (e.g., the distributed ledger). The first node 25 to join the network 30 creates and/or makes all the necessary configurations and criteria for validating an onboarded node (e.g., the Certificate of Authority configurations, minimum number of nodes required for a consensus, etc.). The criteria for validating the onboarded node is stored in a configuration file that is obtained by virtue of downloading the plugin 40. New nodes 25 can join the network 30 after being successfully validated as having a set of characteristics. These characteristics can include, but are not limited to, Hostname, Domain Name System (DNS) of the new host, Subnet of the new host, Netmask, Network Interface of new host, inbound/outbound network bandwidth, etc. In an embodiment, other nodes joining the network automatically pick up on the configuration of the first node to join the network.

In one or more embodiments, when a client requests access to any node 25 (e.g., to a remote host) in the network 30, one of the nodes 25 is selected to issue a signed digital certificate. In an aspect a node is selected at random to sign the client's public key with the shared Certificate of Authority (CA) keys. In an embodiment, before access is granted to the client to the network, the nodes with available resources compute the consensus algorithm to verify the authenticity of the request. When the authenticity of the request is validated, the digital certificate (CA) is signed, a block is created, and the signed digital certificate (e.g., CA) is added as a block to the blockchain (e.g., a new entry is made in the distributed ledger). In a further embodiment, compute nodes in the network are ranked according to how much free and/or unused capacity they can use to issue signed digital certificates, and compute the consensus algorithm. In an aspect those nodes with the largest amount of unused and/or free computing capacity are used to execute the consensus algorithm to verify the authenticity of the client request. In this manner, compute nodes with resources available for blockchain operations are used to compute and/or solve the blockchain security protocol so as to avoid consumption of compute resources for mission critical operations from being used for the blockchain operations. Each compute node in a network, in an embodiment, stores a current copy of the blockchain (the distributed ledger).

Figure 6:
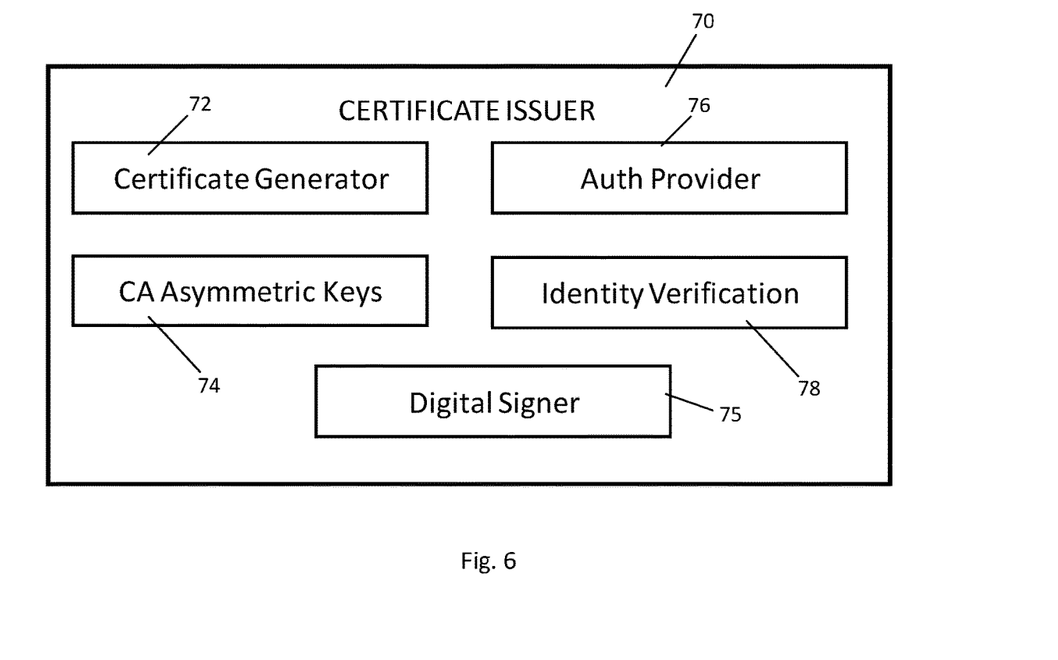
FIG. 6 diagrammatically illustrates a diagram of a Certificate Issuer module as part of the Plugin in FIG. 5 according to one or more embodiments of the present disclosure.

Turning to more of the specifics of the embodiment of plugin 40 in FIG. 5, Certificate Issuer Module 70 described in more detail in FIG. 6 generates and issues the digital certificate, e.g., a Certificate of Authority (CA). Certificate Issuer Module 70 in an embodiment contains instructions and logic to operate circuitry to issue a digital certificate. In one or more embodiments, instead of one node issuing a Certificate of Authority (CA), every node in a network, e.g. network 30, can issue a Certificate of Authority (CA). Ranking Algorithm Module 42 in an aspect determines and/or calculates the CPU capacity of the nodes 25, and identifies and/or ranks those nodes 25 in the network 30 that have the greatest CPU capacity, e.g., unused computing power. The Ranking Algorithm Module 42 in an aspect determines and/or selects which nodes can participate in solving the blockchain consensus problem and issue the digital certificate. The Ranking Algorithm Module 42 in an embodiment has instructions and logic for operating circuitry to determine, calculate, identify, and/or rank CPU computing power of the nodes 25 in the network 30. In an aspect, the Ranking Algorithm 42 in each plugin 40 determines the CPU computing power for its respective node 25 and receives the CPU computing power of the other nodes in the network. In one or more embodiments, the Ranking Algorithm Module 42 is looking for nodes that are not running mission critical processes so that permissioned blockchain operations can be performed by nodes that are not performing mission critical operations.

Nonce solution Generator 44 generates possible solutions to a nonce and stores those possible solutions in the Nonce Solution Store 66. A nonce is an abbreviation for "number only used once," and represents a solution to a mathematical cryptographic problem. The nonce is the number (e.g., a hash) that blockchain miners are solving for. Nonce Solution Generator 44 has in an embodiment instructions and logic for operating circuitry to generate and solve for a cryptographic nonce. Whichever node can produce a solution to the nonce, that node will be selected to mine the block into the blockchain and generate the digital certificate (CA). Nonce solution generators are well known in the art. RAFT Protocol Module 46 synchronizes data across all nodes in a network. RAFT is a consensus algorithm that distributes a state machine across a cluster/network of computing nodes, ensuring that each node in the cluster/network agrees upon the same series of state transitions. RAFT Protocol Module 46 includes instructions and logic for operating circuitry to synchronize data across all the computing nodes in the network.

Plugin 40 further includes Document Database 50, which includes blockchain database 52 and State database 54. Blockchain database 52 contains the blockchain, e.g., the distributed ledger of issued Certificates of Authority (CAs). State database 54 includes the state of machines in the network 30, e.g., node information such as for example memory, storage, workload (processes), hostname, IP address, etc. Plugin 40 also includes Key-Value Database 60, which includes deadline database 62, nonce difficulty database 64, and nonce solution store 66. Deadline database 62 stores the deadline, e.g., the amount of time, for any of the miners (nodes participating in the proof-of-capacity algorithm) to solve for the nonce. The nonce difficulty database 64 contains criteria that provides a solution to the nonce. For example, the nonce difficulty could be set as a random 16-digit number starting with three zeros (0s). The nonce solution store 66 contains the list of all solutions (possible guesses) to the nonce.

The Certificate Issuer Module 70 includes Certificate Generator Module 72, CA Asymmetric Keys Module 74, Digital Signer Module 75, Auth Provider Module 76, and Identity Verification Module 78 as illustrated in FIG. 6. The Certificate Generator Module 72 has instructions and logic for operating circuitry to generate the digital certificates. The Certificate Generator Module 72 is invoked when a node solves for the cryptographic nonce (e.g., the proof-of-capacity process of selecting the node that will issue the digital certificate). The output of the Certificate Generator is the digital certificate.

The Auth Provider 76 has instructions and logic for operating circuitry to provide and/or determine the authentication of a legitimate user. The Auth Provider Module 76 receives input from Identity Verification Module 78 to verify the identity of the user, e.g., the client attempting to obtain remote access. The Identity Verification Module 78 has instructions and logic for operating circuitry to verify the identity of the user, e.g., a user's token. The Identity Verification Module 78 takes in a Auth Provider (e.g., Microsoft Active Directory, Google Suite, Okta, Tokens) from the Auth Provider Module 76 and the client credentials. The Identity Verification Module 78 outputs a Boolean (e.g., true/false indicator) to indicate whether the client can be successfully authenticated. The client needs to specify the credential and the authentication method prior to trying to SSH into a node in the network.

The CA Asymmetric Keys Module 74 stores the public and private keys for each node in the network. The two keys are used as input to the Digital Signer Module 75. The Digital Signer Module 75 has instructions and logic for operating circuitry to sign the Certificate of Authority (CA). When the digital certificate is generated, the Digital Signer Module 75 signs the digital certificate with the private key it receives from the CA Asymmetric Keys Module 74. The Digital Signer Module 75 receives input (the private key) from the CA Asymmetric Keys Module 74 and the digital certificate (e.g., the CA) from the Certificate Generator 72 and appends the private key to the digital certificate (e.g., the CA). The Digital Signer Module 75 outputs the signed digital certificate (e.g., the CA) to be added as data in the new block to be added to the block chain, and also the certificate is returned to the client to be used as a permission to log into the target node. The target node can tell if the certificate used by the client is a legitimate one.

The Plugin 40, and Ranking Algorithm 42, Nonce Solution Generator 44, RAFT Protocol Module 46, Document database 50, Key-Value Database 60, and Certificate Issuer Module 70 will be discussed in more detail in connection with FIGS. 7-10.

Figure 7:
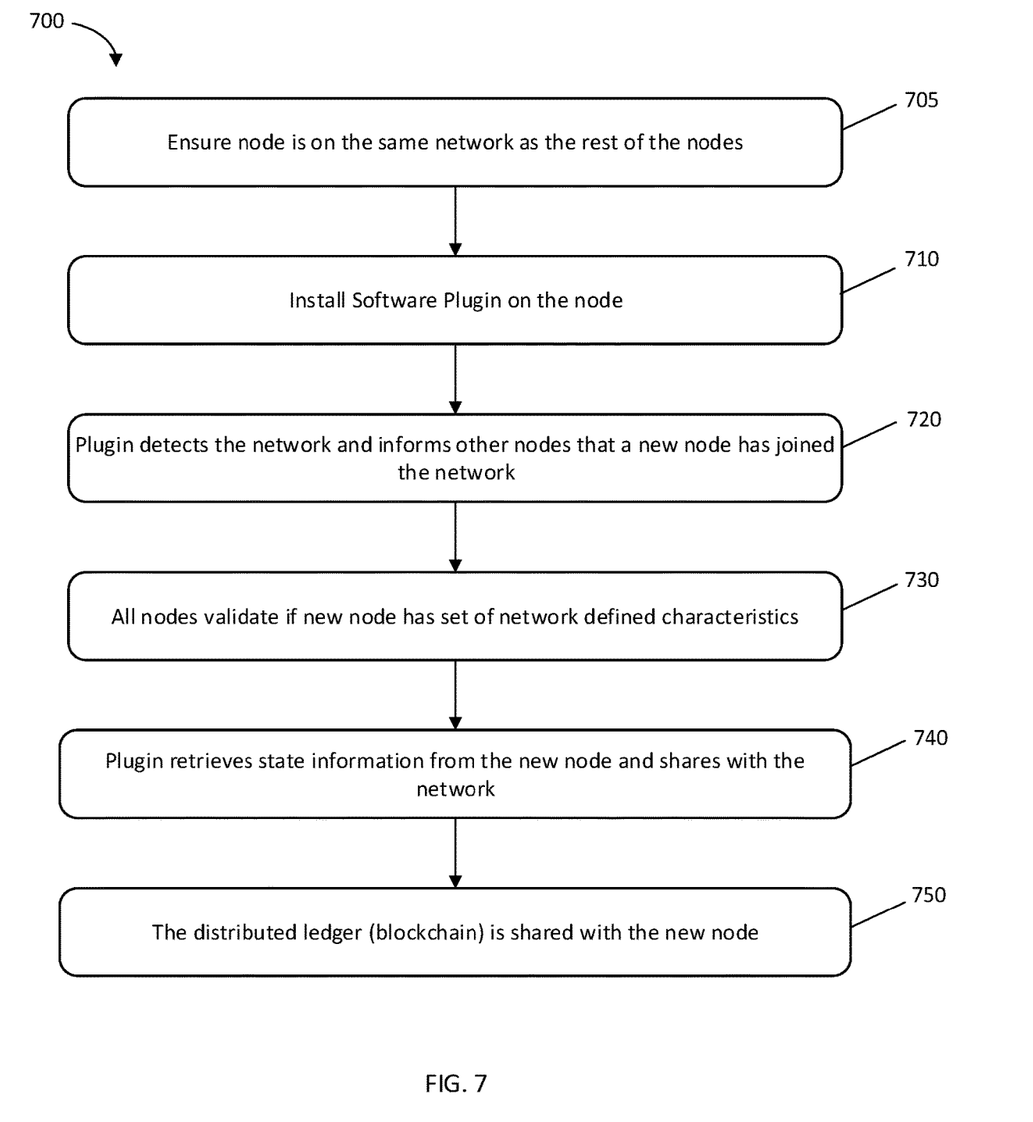
FIG. 7 illustrates a diagrammatic flowchart of a method to add computing nodes, e.g., host nodes, to a network according to an embodiment of the present disclosure.

FIG. 7 is an exemplary flowchart in accordance with an embodiment illustrating and describing a method 700 of adding a node to a network, including in an aspect securely adding a host node to a group of hosts in a network, preferably a closed network. While the method 700 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 7, but the process may be integrated and/or one or more steps may be performed together, simultaneously, or the steps may be performed in the order disclosed or in an alternate order.

In one or more aspects, the method 700 of adding a new node, e.g., host node, to a network includes at 705 checking and/or verifying that the new node to be added is on the same network as the rest of the nodes, e.g., the rest of the host nodes. In one or more embodiments, checks are made to determine if the node to be added is on/for the same primary domain name system (DNS), the same subnet, and/or the same network interface. The network in one or more embodiments is a closed network. At 710 the software plugin, e.g., plugin 40, is installed on the new node. At 720, the plugin on the new node, e.g., node 25, detects the network and informs the other nodes on the network that a new node has joined the network. All the nodes in the network at 730 validate if the new node has a set of network defined characteristics. Before a new node, e.g., a new host node, can join the network of nodes, e.g., the closed network, and participate in permissioned blockchain capabilities, the new node needs to be validated against a set of defined characteristics. These characteristics can include, but are not limited to, Hostname, Domain Name System (DNS) of the new node (e.g., the host node), Subset of the new node (e.g., the host node), Netmask, Network Interface of the new node (e.g., the new host node), inbound/outbound network bandwidth, etc.

The plugin, e.g., plugin 40, at 740 retrieves state information from the new node and shares the state information with the network, e.g., each of the other nodes in the network. In an aspect, the state information is retrieved from the State Database 54 in the document database 50 in plugin 40 to transmit the state information to the other nodes in the network. A method and manner of distributing state information in the network includes utilizing RAFT protocol, and in an embodiment is described in method 1000 and the flowchart of FIG. 10. The blockchain, e.g., the distributed ledger, is shared at 750 with the new node. In an aspect, the distributed ledger is sent by and/or obtained from the other nodes in the network to the new node. In this manner a new node, preferably a host node, is added to a network, preferably a closed network, that in one or more embodiments has permissioned blockchain capabilities. The new node preferably has a copy of the entire distributed/shared ledger, e.g., the entire blockchain.

Figure 8:
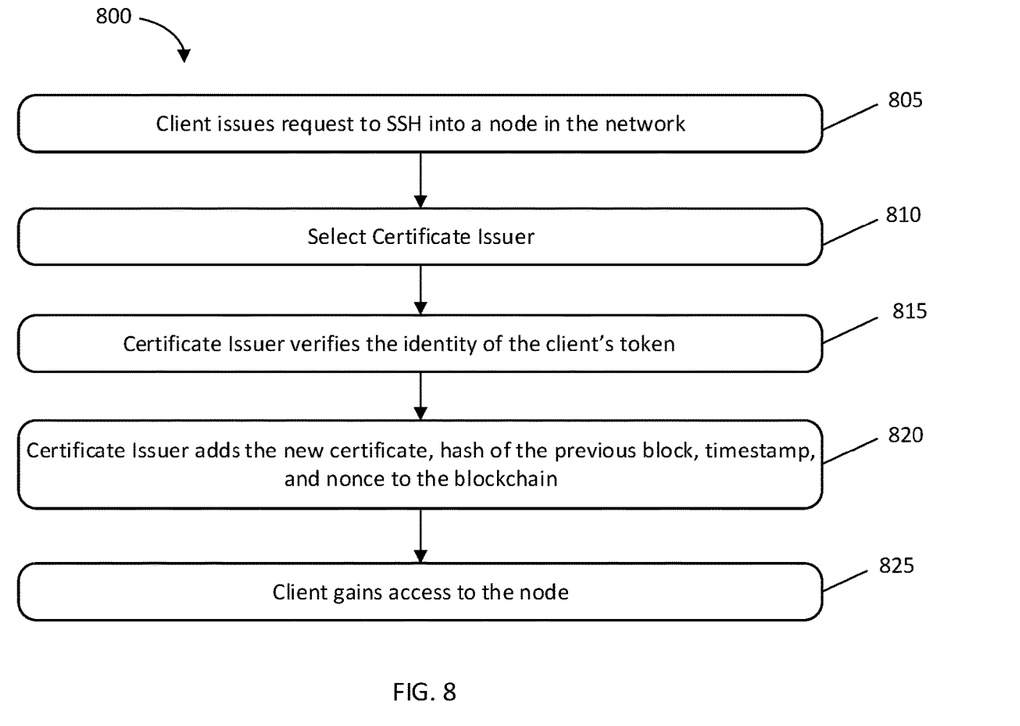
FIG. 8 illustrates a diagrammatic flowchart of a method for a node, e.g., a client, to gain access to one of the nodes in a network according to an embodiment of the present disclosure.

FIG. 8 is an exemplary flowchart describing a method 800 of remote accessing into a node in a network, preferably Secure Shell (SSH) remote accessing a node in the network. While the method 800 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 8, but the process may be integrated and/or one or more steps may be performed together, simultaneously, or the steps may be performed in the order disclosed or in an alternate order.

Method 800 in an embodiment is directed to remotely accessing a node in a network, and in an aspect particularly to obtain Secure Shell (SSH) remote access to a network. At 805 a client requests remote access into a node in the network. In an embodiment, a client issues a request to Secure Shell (SSH) into a node in the network. The network in one or more aspects is a closed network. At 810, the Certificate of Authority (CA) Issuer is selected. An embodiment of selecting the Certificate of Authority (CA) Issuer is described in more detail in connection with the flowchart and method 900 of FIG. 9.

At 815 the selected Certificate Issuer verifies the identity of the client's token. In this regard, the client that wants to remote access into a node in the network sends its token to the selected Certificate Issuer 70 in the plugin 40. The client's token is generated at the client node where it is established that the selected Auth Provider will authenticate the client credentials and issue a token. The client is the combination of the client's credentials. The client should have existing credentials in the Auth Provider Module 76. In an embodiment, at 815 the Identity Verification Module 78 in the Certificate Issuer 70 is used to verify the client's token (the client's credentials) against the Auth Provider specified in the Auth Provider Module 76. That is, in an aspect at 815 the identity of the client is verified by the identity verification module 78 (the identity verification module checks if the client's token is valid. At 820 the Certificate Issuer adds the new certificate, hash of the previous block, timestamp, and nonce to the blockchain, which is stored in the Blockchain Database 52 in Document Database 50 in the software Plugin 40 installed on all the nodes in the network, e.g., the closed network. This information is synced with the other nodes in the network using the RAFT Protocol Module in the Plugin 40. At 825, the client gains access to the node.

In an embodiment, at 815-825 a permissioned blockchain process is carried out to permit a client/user to obtain remote access to a network. In an aspect, each node in the network works together to sign/issue a Certificate Authority to remove the dependency of CA issuance on one single node. Every host in the network has a copy of all the clients granted access to any of the remote hosts. All hosts have a copy of the shared ledger which identifies all clients who have, have had, or have been denied access to any of the remote hosts in the network.

Figure 9:
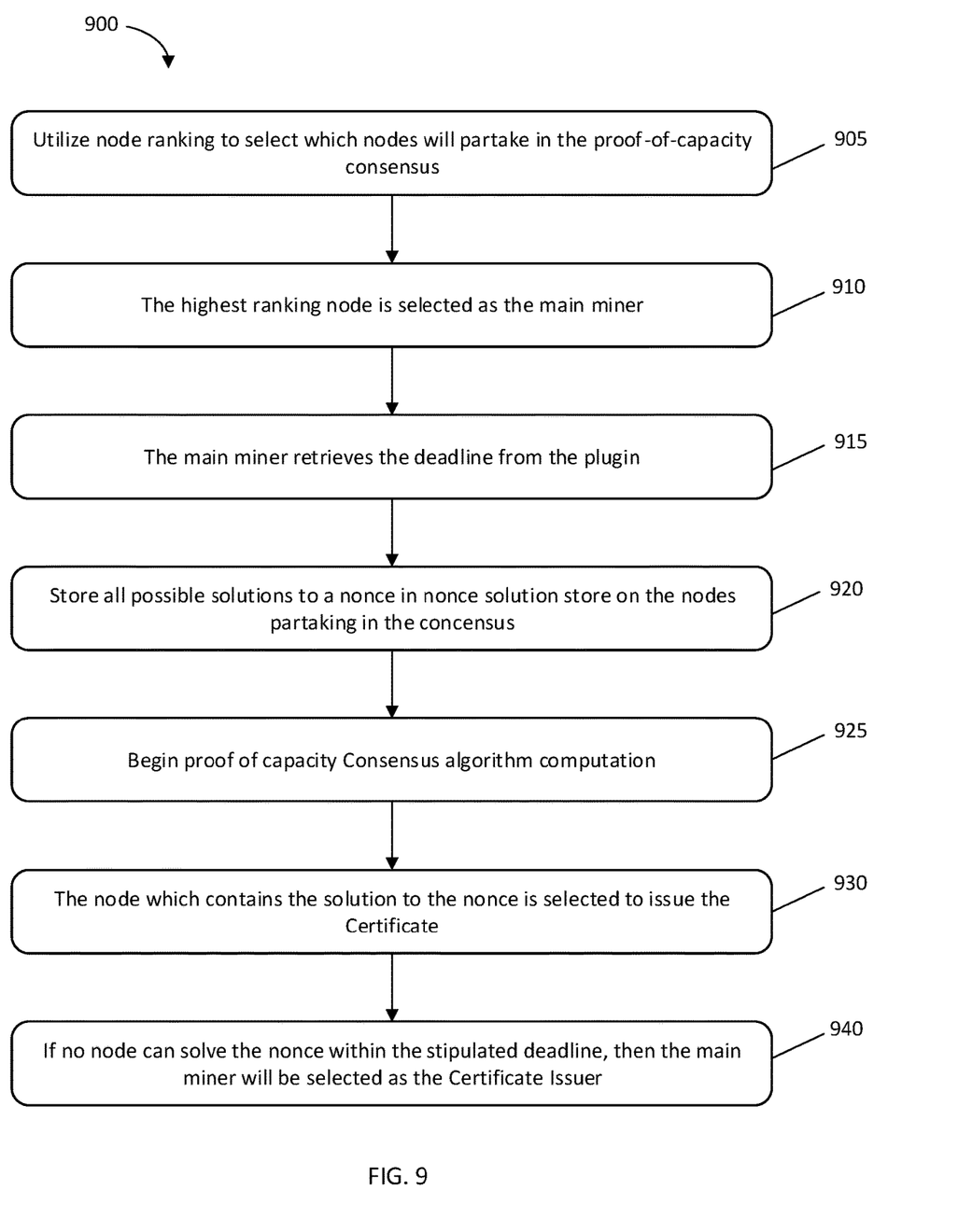
FIG. 9 illustrates a diagrammatic flowchart of a method to select a Certificate of Authority (CA) Issuer according to an embodiment of the present disclosure.

FIG. 9 is an exemplary flowchart describing a method 900 of selecting a Certificate Issuer, preferably for Secure Shell (SSH) remote accessing a node in the network. While the method 900 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 9, but the process may be integrated and/or one or more steps may be performed together, simultaneously, or the steps may be performed in the order disclosed or in an alternate order. In one or more embodiments the method 900 is used to select the Certificate Issuer at 810 in method 800. Other methods for selecting the Certificate Issuer are contemplated.

At 905, node rankings are used to select which one or more nodes will participate in the proof-of-capacity consensus, e.g., the blockchain proof of capacity consensus. In an embodiment, a plurality of nodes is selected to partake in the proof-of-capacity consensus, preferably an odd number of nodes. The proof-of-capacity consensus is a solution to a cryptography problem, and solving the cryptography problem uses available space on a node's storage, e.g., hard drive, to compute a solution to the cryptography problem. In one or more embodiments, the CPU capacity of the nodes in the network are computed and ranked in the Ranking Algorithm Module 42. The node CPU capacity rankings are used at 905 to select one or more, preferably 3 or more, nodes that are used to solve the proof-of-capacity consensus.

At 910 the highest ranking node is selected as the main miner. The main miner at 915 retrieves the deadline from the plugin. That is, in an embodiment, the main miner retrieves at 915 from its plugin 40 the deadline from Deadline Database 62 in Key-Value Database 60. The deadline is an amount of time, e.g., in seconds, that elapses before one of the miner's (e.g., nodes) selected to participate in the solving the proof-of-capacity consensus is selected as the miner (node) to solve for the nonce. The nonce (number only used once) is the number that the miners are solving for, e.g., guessing, as a solution to the cryptography problem. The cryptography problem is the nonce solution (which is stored in Nonce Difficulty Database 64 in Key-Value Database 60).

At 920 all the nodes partaking in solving the proof-of-capacity cryptography consensus problem stores all possible solutions to the nonce in Nonce Solution Store 66. That is at 920 each node selected to partake in the proof-of-capacity consensus stores in its Nonce Solution Store 62 all possible solutions to the nonce. At 925 each node selected as a miner to participate in the proof-of-capacity consensus begins the proof-of-capacity consensus algorithm computation. In an embodiment, each possible solution from the Nonce Solution Store 66 is used by each Nonce Solution Generator 44 in each node (e.g., miner) selected to participate in the blockchain proof of capacity consensus to generate a solution to the nonce. At 930, the first node which contains the solution to the nonce within the deadline is selected to issue the Certificate of Authority. That is, at 930 the node which solves the nonce will issue a new Certificate of Authority. If no node solves the nonce within the stipulated deadline time, then at 940 the main miner will be selected as the node to issue the Certificate of Authority. In one or more embodiments, during implementation, the nonce does not have to be solved (guessed) by the main miner, or any other node.

Figure 10:
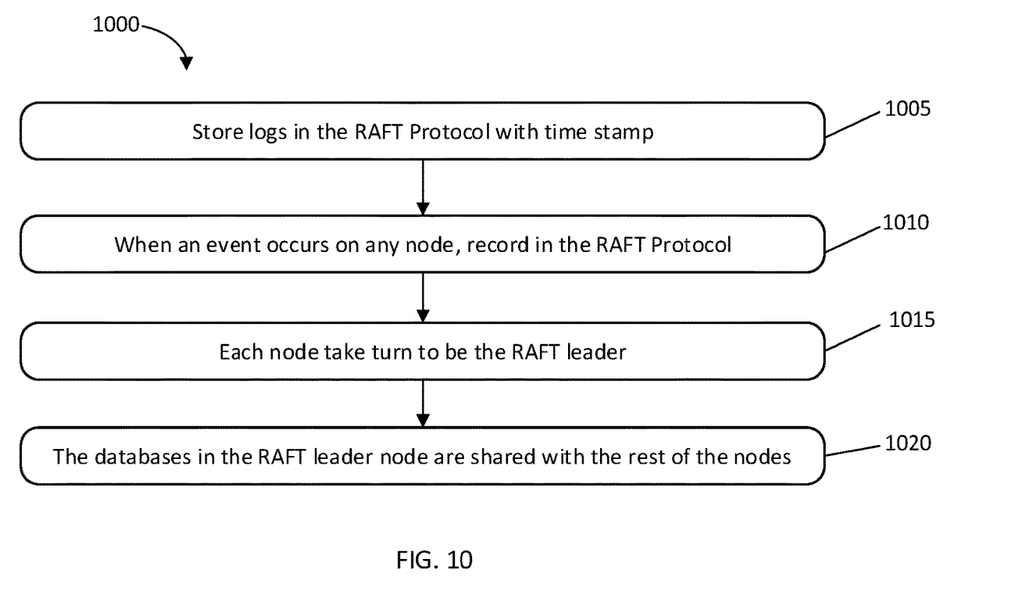
FIG. 10 illustrates a diagrammatic flowchart of a method to synchronize data between nodes in a network according to an embodiment of the present disclosure.

FIG. 10 is an exemplary flowchart describing a method 1000 of synchronizing data across the nodes, e.g., nodes 25, of the network, e.g., closed network 30. While the method 1000 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 10, but the process may be integrated and/or one or more steps may be performed together, simultaneously, or the steps may be performed in the order disclosed or in an alternate order.

At 1005, logs and/or databases are stored in the RAFT Protocol Module with a time stamp. RAFT (Reliable, Replicated, Redundant, and Fault-tolerant) is a consensus algorithm that offers a way to distribute a state machine across a cluster/network of computing nodes or systems. In an aspect, logs and/or databases in the RAFT Protocol Module 46 in the plugin 40 of the node 25 are stored with a timestamp. At 1010, in response to an event occurring and/or when an event occurs, on any node, data on the event is recorded in the RAFT Protocol Module 46. A node at 1015 is selected as the RAFT leader. In an embodiment, each node takes a turn as the RAFT leader, preferably in a round robin manner, although other selection processes are contemplated. At 1020 the databases in the RAFT leader node are shared with the rest of the nodes. The databases in the RAFT leader can be shared in response to or when an event occurs on a node, at fixed or dynamic time periods, or according to other criteria. RAFT protocol is known in the art and other means to distribute a state machine across the nodes of the network are contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor, functional units of a processor, or computer implemented system, and logic integrated with and/or executable by the system, processor, or functional units, the logic being configured to perform one or more of the process steps cited herein. What is meant by integrated with is that in an embodiment the functional unit or processor has logic embedded therewith as hardware logic, such as an application specific integrated circuit (ASIC), a field programmable gate array (FPGA), etc. By executable by the functional unit or processor, what is meant is that the logic in an embodiment is hardware logic; software logic such as firmware, part of an operating system, part of an application program; etc., or some combination of hardware or software logic that is accessible by the functional unit or processor and configured to cause the functional unit or processor to perform some functionality upon execution by the functional unit or processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above. If will be further appreciated that embodiments of the present invention may be provided in the form of a service deployed on behalf of a customer to offer a service on demand.

The terminology used herein is for the purpose of describing particular embodiments only and is not intended to be limiting of the invention. Unless otherwise specifically defined herein, all terms are to be given their broadest possible interpretation including meanings implied from the specification as well as meanings understood by those skilled in the art and/or as defined in dictionaries, treatises, etc. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment and terminology was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of providing access to a network of computing nodes, the method comprising:
   requesting, by a client, access into a host node in the network;
   ranking the computing nodes in the network;
   selecting according to their rank in the network one or more computing nodes to participate in a proof-of-capacity consensus to solve for a nonce;
   selecting a digital certificate issuer;
   verifying, by the digital certificate issuer, an identity of a client's token;
   adding, by the digital certificate issuer, the nonce to a distributed ledger; and
   granting the client access to the host node in the network.

2. The computer-implemented method according to claim 1, wherein ranking the computing nodes in the network is based upon their unused CPU capacity.

3. The computer-implemented method according to claim 1, further comprising selecting the computing node with the highest rank as the main miner, and retrieving, by the main miner, a deadline from a plugin installed on the main miner.

4. The computer-implemented method according to claim 3, further comprising storing, in a nonce solution store on all the computing nodes selected to participate in the proof-of-capacity consensus, all possible solutions to the nonce.

5. The computer-implemented method according to claim 4, further comprising computing, by all the computing nodes selected to participate in the proof-of-capacity consensus, the proof-of-capacity consensus to solve for the nonce.

6. The computer-implemented method according to claim 5, further comprising selecting the node that contains the solution to the nonce to be the digital certificate issuer.

7. A computer-implemented method according to claim 4, further comprising:

computing, by all the computing nodes selected to participate in the proof-of-capacity consensus, the proof-of-capacity consensus to solve for the nonce, and selecting, in response to none of the computing nodes selected to participate in the proof-of-capacity consensus solving for the nonce within the deadline, the main miner as the digital certificate issuer.

8. The computer-implemented method according to claim 1, further comprising adding a new host node to the network, wherein adding a new host node to the network comprises:

determining, by all the computing nodes on the network, if the new host node has a set of network defined characteristics;

retrieving, in response to determining that the new host node has a set of network defined characteristics, state information from the new host node; and sharing the state information with all the computing nodes on the network.

9. The computer-implemented method according to claim 8, wherein adding a new host node to the network further comprises sharing the distributed ledger with the new host node.

10. The computer-implemented method according to claim 9, wherein adding a new host node to the network further comprises:

ensuring the new host node is to be added to the same network as the computing nodes;

installing a plugin on the new host node;

detecting the network by the plugin; and informing all the computing nodes on the network that a new host node has joined the network.

11. The computer-implemented method according to claim 9, wherein sharing the distributed ledger with the new host node comprises utilizing a RAFT protocol wherein databases containing the distributed ledger in a RAFT leader node are shared with the new host node.

12. A non-transitory computer readable medium comprising instructions that, when executed by at least one hardware processor, configure the at least one hardware processor to:

request, by a client, access into a host node in a network of computing nodes;

rank the computing nodes in the network;

select, according to their rank in the network, one or more computing nodes to participate in a proof-of-capacity consensus to solve for a nonce;

select one of the computing nodes to issue a digital certificate;

verify, by the computing node selected to issue the digital certificate, an identity of a client's token;

add, by the computing node selected to issue the digital certificate, a nonce to a distributed ledger; and grant the client access to the host node in the network.

13. The non-transitory computer readable medium according to claim 1, wherein ranking the computing nodes in the network is based upon their unused CPU capacity wherein at least three computing nodes with the largest unused CPU capacity are selected to participate in the proof-of-capacity consensus.

14. The non-transitory computer readable medium according to claim 1, further comprising instructions, that when executed by at least one hardware processor, configure the at least one hardware processor to:

store, in the nonce solution store on all the computing nodes selected to participate in the proof-of-capacity consensus, all possible solutions to the nonce;

compute, by all the computing nodes selected to participate in the proof-of-capacity consensus, the proof-of-capacity consensus to solve for the nonce; and select the node that contains the solution to the nonce to be the computing node that issues the digital certificate.

15. The non-transitory computer readable medium according to claim 14, further comprising instructions, that when executed by at least one hardware processor, configure the at least one hardware processor to:

select the computing node with the highest rank as the main miner;

retrieve, by the main miner, a deadline from a plugin installed on the main miner;

compute, by all the computing nodes selected to participate in the proof-of-capacity consensus, the proof-of-capacity consensus to solve for the nonce; and select, in response to none of the computing nodes selected to participate in the proof-of-capacity consensus solving for the nonce within the deadline, the main miner as the computing node to issue the digital certificate.

16. The non-transitory computer readable medium according to claim 12, further comprising instructions, that when executed by at least one hardware processor, configure the at least one hardware processor to add a new host node to the network, wherein adding a new host node to the network comprises instructions, that when executed by the at least on hardware processor, configure the at least one hardware processor to:

determine, by all the computing nodes on the network, if the new host node has a set of network defined characteristics;

retrieve, in response to determining that the new host node has a set of network defined characteristics, state information from the new host node; and share the state information with all the computing nodes on the network.

17. The non-transitory computer readable medium according to claim 16, wherein adding a new host node to the network further comprises instructions, that when executed by the at least one hardware processor, configure the at least one hardware processor to share the distributed ledger with the new host node.

18. The non-transitory computer readable medium according to claim 17, wherein adding a new host node to the network further comprises instructions, that when executed by the at least one hardware processor, configure the at least one hardware processor to:

determine if the new host node is to be added to the same network as the other compute nodes;

install, in response to determining that the new host node is to be added to the same network as the other compute nodes, a plugin on the new host node;

detect the network by the plugin; and inform all the computing nodes on the network that a new host node has joined the network.

19. A computer-implemented system to configure a network of computing nodes comprising:

a memory storage device storing program instructions; and a hardware processor having circuitry and logic to execute said program instructions to configure the network of computing nodes, the hardware processor coupled to said memory storage device and in response to executing said program instructions is configured to:

request, by a client, remote access into a host node in the network of computing nodes;

rank the computing nodes in the network according to an amount of unused CPU capacity;

select a plurality of computing nodes to participate in a proof-of-capacity consensus to solve for a nonce based upon the ranking of the amount of unused CPU capacity;

compute the proof-of-capacity consensus by all the plurality of computing nodes selected to participate in the proof-of-capacity consensus to solve for the nonce;

select the node that contains the solution to the nonce to be a digital certificate issuer;

verify, by the digital certificate issuer, an identity of a client's token;

add, by the certificate issuer, the nonce to a distributed ledger; and grant the client access to the host node in the network.

20. The computer-implemented system according to claim 19, further configured to:

select the computing node with the highest rank as the main miner;

compute, by all the computing nodes selected to participate in the proof-of-capacity consensus, the proof-of-capacity consensus to solve for the nonce; and select, in response to none of the computing nodes selected to participate in the proof-of-capacity consensus solving for the nonce within a deadline, the main miner as the digital certificate issuer.

21. The computer-implemented system according to claim 19, further configured to add a new host node to the network comprising configuring the system to:

determine, by all the computing nodes on the network, if the new host node has a set of network defined characteristics; and retrieve, in response to determining that the new host node has a set of network defined characteristics, state information from the new host node; and share the state information with all the computing nodes on the network.

22. The computer-implemented system according to claim 21, wherein adding a new host node to the network further comprises configuring the system to:

determine if the new host node is to be added to the same network as the other computing nodes;

install, in response to determining that the new host node is to be added to the same network as the other computing nodes, a plugin on the new host node;

detect the network by the plugin;

inform all the computing nodes on the network that a new host node has joined the network; and share the distributed ledger with the new host node,
  wherein the plugin includes a Certificate Issuer Module, a Ranking Algorithm Module, a Nonce Generator, a Document Database containing the distributed ledger and state information, and a Key-Value Database.

* * * * *